United States Patent
Crawley et al.

[11] Patent Number: 5,756,192
[45] Date of Patent: May 26, 1998

[54] MULTILAYER COATING FOR DEFROSTING GLASS

[75] Inventors: Richard Lee Crawley, Ann Arbor; Kenneth Edward Nietering; James William Proscia, both of Dearborn, all of Mich.

[73] Assignee: Ford Motor Company, Dearborn, Mich.

[21] Appl. No.: 585,677

[22] Filed: Jan. 16, 1996

[51] Int. Cl.$^6$ .................................................. B32B 17/06
[52] U.S. Cl. .................... 428/216; 359/359; 359/580; 359/585; 427/162; 427/164; 427/165; 427/166; 427/167; 428/336; 428/428; 428/697; 428/698; 428/699; 428/701; 428/702
[58] Field of Search ............................. 428/428, 469, 428/472, 216, 336, 701, 702, 697, 698, 699; 359/359, 585, 580; 427/126.1, 162, 164, 165, 166, 167

[56] References Cited

U.S. PATENT DOCUMENTS

| | | |
|---|---|---|
| 3,720,541 | 3/1973 | King . |
| 4,017,661 | 4/1977 | Gillery . |
| 4,485,146 | 11/1984 | Mizuhashi et al. . |
| 4,859,499 | 8/1989 | Sauvinet et al. . |
| 5,208,095 | 5/1993 | Nietering . |
| 5,264,286 | 11/1993 | Ando et al. ............................. 428/432 |

(List continued on next page.)

FOREIGN PATENT DOCUMENTS

| | | |
|---|---|---|
| 0 386 993 | 12/1990 | European Pat. Off. . |
| 43 24 576 C1 | 1/1995 | Germany . |
| 62-64003 | 9/1985 | Japan . |
| 62-64003 | 3/1987 | Japan . |
| 7-178866 | 7/1995 | Japan . |

OTHER PUBLICATIONS

T. Oyama et al, "Low Resisssstance Indium Tin Oxide Films On Large Scale Glass Substrate", 1992.
American Vacuum Society, J. Vac. Sci. Technol. A 10(4), Jul./Aug. 1992.
"High Conductive and Transparent Aluminum Doped Zinc Oxide Thin Films Prepared By RF Magnetron Sputtering" Tadatsugu Minami et al, Japanese Journal of Applied Physics, vol. 23, No. 5, May 1984, pp.L280–L282.

(List continued on next page.)

Primary Examiner—Archene Turner
Attorney, Agent, or Firm—Lorraine S. Melotik

[57] ABSTRACT

This invention is directed to a glass substrate having deposited thereon an electroconductive coating useful for defrosting the glass. The coating comprises three layers. The first layer deposited on the glass is selected from the group consisting essentially of: (a) silicon oxide and (b) silicon nitride and it is deposited on at least a portion of a surface of the glass substrate. The second layer comprises an electrically conductive material selected from the group consisting essentially of (a) aluminum doped zinc oxide and (b) gallium doped zinc oxide. It is deposited on at least a portion of the first layer in a thickness of at least 1 micron. This second layer has a sheet resistance of less than 20 ohms per square. A third layer comprising a protective material is deposited on and is at least coextensive with the second layer. It is deposited in a thickness of at least 10 microns and is selected from the group of materials consisting essentially of: (a) fluorine doped tin oxide, and (b) silicon nitride. This third layer has a refractive index within 10% of that of the second layer.

20 Claims, 1 Drawing Sheet

U.S. PATENT DOCUMENTS

| | | |
|---|---|---|
| 5,270,517 | 12/1993 | Finley . |
| 5,298,048 | 3/1994 | Lingle et al. . |
| 5,342,676 | 8/1994 | Zagdoun . |
| 5,376,455 | 12/1994 | Hartig et al. . |
| 5,387,433 | 2/1995 | Balian et al. .......................... 427/126.3 |
| 5,443,862 | 8/1995 | Buffat et al. .......................... 427/126.3 |

OTHER PUBLICATIONS

Hong Koo Kim et al, "Thermally Stable ZnO Films Deposited on GaAs Substrates With a SiO$_2$ Thin Buffer Layer", 1992 American Institute of Physics, Appl. Phys. Lett. 61 (21), 23 Nov. 1992.

N.M. Ataev et al, "Highly Conductive And Transparent Ga–doped Epitaxial ZnO Films on Sapphire by CVD", Thin Solid Films 260 (1995) 19–20.

S. Takata et al, "The Stability of Aluminum–Doped ZnO Transparent Electrodes Fabricated By Sputtering" Elsevier Sequoia, Accepted: Jul. 15, 1985.

D. M. Mattox, "Sol–Gel Derived, Air–Baked Indium And Tin Oxide Films", Thin Solid Films, 204 (1991) Preparation And Characterization.

5,756,192

MULTILAYER COATING FOR DEFROSTING GLASS

FIELD OF THE INVENTION

The invention is directed to a glass substrate like automotive side glass having deposited thereon a multilayer coating comprising an electrically conductive layer capable of heating the glass, such as automotive windshields, in order to defrost the glass. More particularly, this coating includes layers on either side of the electrically conductive layer to stabilize the chemical and electrical properties of the layer during fabrication of the glass at elevated temperatures.

BACKGROUND OF THE INVENTION

Traditionally automotive glass has been defrosted using forced air heating ducts or electrically conductive paint, such as silver paint, applied in gridlines fused onto the glass. More recently, automotive windshields have been available which incorporate in between the laminated glass layers a thin silver coating as the conductive element. This silver layer was thin enough to be fairly transparent to visible light. It was also conductive enough to provide adequate ohmic heating for defrosting.

Use of a silver coating in automotive windshields, however, is less than desirable because it requires special fabrication techniques. At the elevated temperatures employed for bending glass, approximately 600° C. for 10 minutes, silver is attacked by chemicals found in the air which tends to degrade the optical and electrical properties of the silver. Thus the silver coating had to be applied after bending of the glass was completed. In addition, since silver is itself not particularly durable, its usefulness was limited to areas where it was protected, such as inside the laminate of the windshield. Even then additional layers were added to protect the silver layer and improve its optical performance.

The inability to bend the glass after application of the silver coating made the product expensive to produce. Special coating systems and elaborate processes had to be in place for successful manufacturing of the product. As a result, many efforts were undertaken in the industry to develop a 'bendable' transparent conductive coating based on the thin silver layer system. For example, Finley in U.S. Pat. No. 5,270,517 teaches how to add layers to the silver system to make it 'bendable'. This 'bendable' transparent conductive system is much less expensive to manufacture while maintaining good optical transparency in the visible portion of the electromagnetic spectrum. This system is still deficient, however, in that it needs to be encapsulated within a glass laminate system because it has less than desirable durability when exposed to the environment. U.S. Pat. No. 4,485,146 to Mizuhashi et al. discusses the problems associated with applying conductive coatings like tin oxide on alkali-containing glass. It teaches that at high temperatures the alkali-metals diffuse out of the glass and degrade the coating applied thereon. To prevent this diffusion, a special silicon oxide layer which contains hydrogen bonded to silicon is first applied on the alkali-containing glass. This is taught to be an improvement over pure silicon oxide.

It would be commercially desirable if a durable transparent conductive oxide (TCO) was available which could be used coated on an outside glass surface of a windshield to defrost the glass. Further if the TCO coating could be applied by conventional techniques before bending of the glass and still maintain its necessary properties thereafter, it would avoid fabrication limitations associated with only 'after bending' coating materials. One such material which might be suggested for this application is doped tin oxide ($SnO_2$) and tin doped indium oxide (ITO). Doped $SnO_2$ is very durable, chemically transparent, and 'bendable'. However, it is not electrically conductive enough when deposited by conventional sputtering techniques to allow use for automotive glass defrosting. ITO as a transparent conductor is both durable and bendable. It can be produced by several well known techniques such as vacuum deposition, sol-gel chemistry, and pyrolytic spray. It is widely used in the manufacture of liquid crystal displays. In order to provide the necessary heat to defrost a windshield, sheet resistances of less than 3 ohms per square are generally necessary. A relatively thick layer of ITO would be needed to reach this sheet resistance. Since indium is an expensive material, this is a less than desirable option commercially.

More recently, another TCO, zinc oxide doped with aluminum, has been prepared with good electrical conductivity and optical transparency in the visible region of the spectrum. Zinc, aluminum, and oxygen are all readily available materials which are safe, recyclable, and of low cost. However, this TCO is disclosed to not be 'bendable' in the art because its sheet resistance rises several orders of magnitude upon exposure to air at temperatures above 400° C.

We have unexpectedly discovered that aluminum doped zinc oxide can be used as part of an electrically heatable coating to defrost a windshield if provided with protective coatings, i.e., as the middle layer of a specific three-layer coating. This coating overcomes the deficiencies of prior art coatings in that it can be applied before glass bending and still retains excellent optical and electrical properties thereafter. It is also commercially desirable based on the simplicity of fabrication and cost associated with the materials used in the layers.

DISCLOSURE OF THE INVENTION

The invention is directed to a glass substrate having deposited thereon an electrically conductive coating useful for defrosting the glass substrate. This substrate may be an automotive windshield or side glass. The coating comprises three layers. The first layer comprises a material selected from the group consisting of: (a) silicon oxide and (b) silicon nitride deposited on at least a portion of a surface of the glass substrate. The second layer comprises an electrically conductive material selected from the group consisting of (a) aluminum zinc oxide and (b) galium doped zinc oxide deposited on the first layer in a thickness of at least 1 micron and having a sheet resistance less than 20 ohms per square. The third layer comprises a material in a thickness of at least 10 microns deposited on the second layer and is at least coextensive with the second layer. The third layer material is selected from the group consisting essentially of: (a) fluorine doped tin oxide, and (b) silicon nitride, wherein the third layer has a refractive index within 10% of that of the second layer.

DISCLOSURE OF PREFERRED EMBODIMENTS

Figure 1:
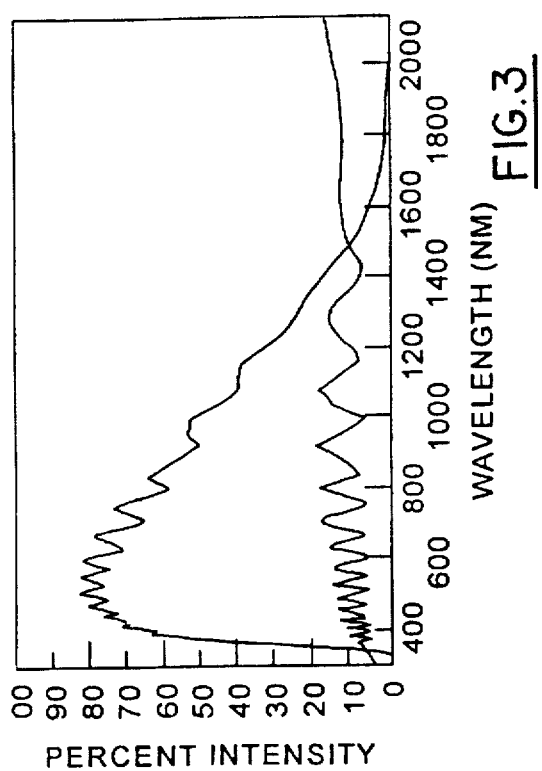
FIG. 1 is a spectrograph which shows the transmission and reflection of an aluminum doped zinc oxide coating on soda-lime-silica glass.

The invention is a glass substrate having deposited thereon a coating comprising three-layers. We found that we could deposit a coating that had excellent heating ability to defrost the glass and also was durable when exposed to the environment during use in an automobile. Most surprisingly, we found that the deposited coating could be exposed to the high temperatures required for bending the glass during fabrication without losing any of its good physical properties, i.e., optical and physical.

The coating involves placing layers of specific materials on either side of an electrically conductive layer which is made of aluminum doped zinc oxide. We have found that this prevents the chemicals from the glass substrate (e.g., common soda-lime-silica automotive glass) or from the atmosphere from interacting with the aluminum doped zinc oxide layer. When we did this we were surprised to find that the resultant thin film stack retained its optical properties even after heating in air to 600° C. for 30 minutes, far longer than that needed for bending and tempering of the glass substrate upon which it is deposited. In addition, the film stack has excellent durability so that it can be used on an outer surface of an automotive vehicle side glass or windshield, i.e., it does not need to be encapsulated within the laminate as with conventional heated windshields. Thus the coating can be used on the interior or exterior of the vehicle glass. As discussed above, this is commercially desirable because the broader applications allow for easier fabrication techniques.

In this invention, the diffusion barrier layer provided on the glass is selected from silicon oxide and silicon nitride. The protective outer layer on top of the aluminum doped zinc oxide is selected from flourine doped tin oxide and silicon nitride.

The first layer, that is the diffusion barrier layer deposited on the glass substrate, consists essentially of silicon oxide or silicon nitride. This layer is deposited at least on that portion of the glass which will later be provided with the electrically conductive second layer. This barrier layer can be provided on the glass by any of many techniques, several being well known and include sputtering, vacuum vapor deposition, CVD processing, ion-plating, or sol-gel techniques. Application techniques are not critical to the invention and optimal techniques to be employed will be dependent on the particular material chosen as would be appreciated by those skilled in the art. Optimally, this barrier layer is provided on the glass in a thickness of at least 5 nm, more preferably being between about 100 and 200 nm. The thickness depends on such factors as layer porosity and its refractive index and selection of optimal first layer thickness would be within the skill of one in the art in view of the present disclosure. Desirably, the silicon oxide has the chemical formula: $SiO_{1.5-2.5}$; more preferably $SiO_{1.8-2.2}$, and optimally it has the chemical formula: $SiO_{1.9-2.1}$. The silicon nitride is preferably of chemical formula: $S_3N_{3.5-4.5}$; more preferably the chemical formula is: $S_3N_{3.8-4.2}$; Optimally the silicon nitride used in a diffusion barrier layer has the chemical formula: $S_3N_{3.9-4.1}$.

The electroconductive coating comprises an aluminum doped zinc oxide or a galium doped zinc oxide, the aluminum doped zinc oxide being preferred. This coating is deposited over at least a portion of the first layer and generally in a thickness of at least 1 micron. This layer will be used to generate heat for defrosting the glass. The sheet resistance of this layer is less than 20 ohms per square. This aluminum doped zinc oxide may be described by the chemical formula in its broadest preferred aspect: $ZnAl_{0.001-0.1}O_{0.8-1.2}$; more preferably being $ZnAl_{0.001-0.05}O_{0.9-1.1}$; optimally being $ZnAl_{0.001-0.03}O_{0.95-1.05}$. The galium doped zinc oxide would have the chemical formula: $ZnGa_{0.001-0.10}O_{8-1.2}$. This layer may be deposited on the first layer by several techniques including sputtering, chemical vapor deposition (CVD), and dip coating. For example, as taught in U.S. Pat. No. 5,342,676, col. 5., lines 46–50, a layer of aluminum doped zinc oxide can be deposited by vapor phase pyrolysis from diethyl zinc or zinc acetate and triethyl aluminum, or aluminum chloride. In particular, one preferred way for providing this layer is by D.C. sputtering from an oxide target.

The outer (third) layer is deposited on top of and is at least coextensive with the eletroconductive second layer to protect it from the chemical environment during glass bending and during later use. It is made of a material selected from flourine doped tin oxide and silicon nitride. In order to provide sufficient protection for the middle layer, it was found that this outer layer was required to be at least 10 nm thick. Preferably, it was at least 20 nm thick. Optimally it is between about 30 and 200 nm thick. Selection of the most desirable thickness for use in this invention depends in part on the particular composition of the protective coating, its porosity and refractive index. Selection of a optimally useful thickness in a selected embodiment of this invention would be apparent to one skilled in the art in view of this disclosure. When the coating is flourine doped tin oxide the preferred thickness is between 10 and 20 nm, while in the case of the silicon nitride layer, the optimal thickness is between 30 and 200 nm. In addition, the third layer has a refractive index within 10% of that of the second layer. This means that if the second layer has a refractive index of 2, than the third layer has a refractive index within 1.8 to 2.2. This is necessary to minimize iridescent color and total reflection of the three layer film stack.

The flourine doped tin oxide in a preferred embodiment has the chemical formula: $F:SnO_{1.5-2.5}$, more preferably being $F:SnO_{1.9-2.2}$, and most preferably being $F:SnO_{1.9-2.1}$. The silicon nitride has the same preferred range of chemical formulas as that used in the diffusion barrier layer disclosed above. That is: $S_3N_{3.5-4.5}$; $S_3N_{3.8-4.2}$; and $S_3N_{3.9-4.1}$.

EXAMPLES

For comparison to embodiments of the present invention, we provided a typical automotive soda-lime-silica glass substrate and coated it with an electroconductive coating (TCO) according to an embodiment of the present invention but without a diffusion barrier or protective layer on either side of this TCO as required in the present invention. Aluminum doped zinc oxide TCO was deposited on the substrate by DC sputtering in a 5 millitorr argon plasma at 500 watts DC current. The sputter target consisted of 2.8 wt. percent $Al_2O_3$ in ZnO. The substrate was first heated to 350° C. and then the material was deposited for 10 minutes. Then we reheated the substrate to 350° C. and deposited the TCO for an additional 10 minutes. This resulted in a TCO coating which was 1.4 micrometers thick having an average sheet resistance of 3.5 ohms per square. Transmittance was better that 78%.

Figure 2:
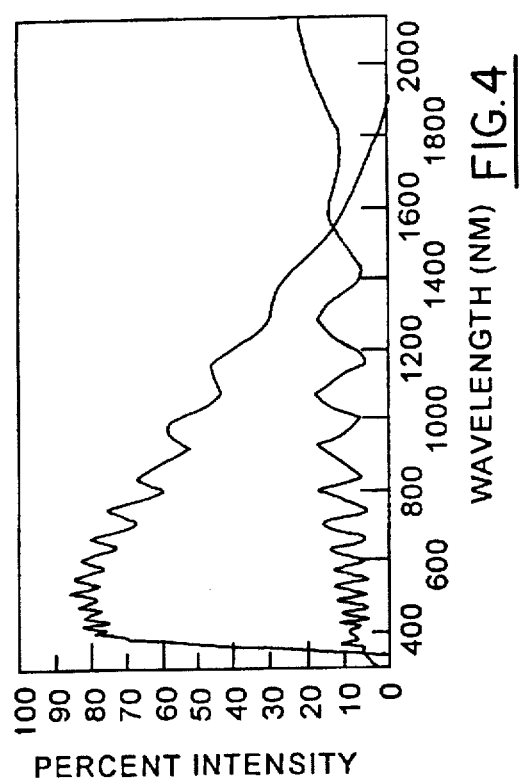
FIG. 2 is a spectrograph which shows the transmission and reflection of the FIG. 1 coating after annealing at 600° C. in air for one hour.

To show the detrimental effect of heating this coating without the other layers, we heated this ZnAlO TCO coated glass sample up to 400° C. for 1 hour. The resistance rose from 2.6 ohms per square up to 4.2 ohms per square which would not be useful according to the present invention to defrost glass. Moreover, when we heated a similar ZnAlO TCO coated glass sample up to 630° C. (as would be experienced during glass bending) for 1 hour, the resistance rose from 2.4 ohms per square up to about 50,000 ohms per square. To again show the detrimental effect of heating an unprotected coating, a ZnAlO coating deposited on glass at room temperature was heated to 630° C. for 1 hour. Its resistance, which measured 11.45 ohms per square before heating, rose to an approximately infinite resistance after this heating. This agrees with the general knowledge in the literature that aluminum doped zinc oxide is not stable at temperatures of 600° C. in air. FIGS. 1 and 2, respectively, show optical transmission and reflectance spectrum of an unprotected AlZnO film before and after annealing at 600° C. in air. The spectrum dramatically changed indicating the thermal instability of this material when unprotected.

The following examples are of embodiments of the present invention three-layer TCO stack. We deposited 100 nm (stack 1c ) and 200 nm (stack 1d) of $Si_3N_4$ on either side of the 1.4 um of ZnAlO. The diffusion barrier layer thicknesses were chosen to minimize the effect on the optical measurements due to interference effects and are not meant to represent optimal barrier thicknesses. These outer protective layers were meant to act as diffusion barrier to help prevent the ZnAlO from being affected by the environment during the high temperature bending cycle.

Figure 3:
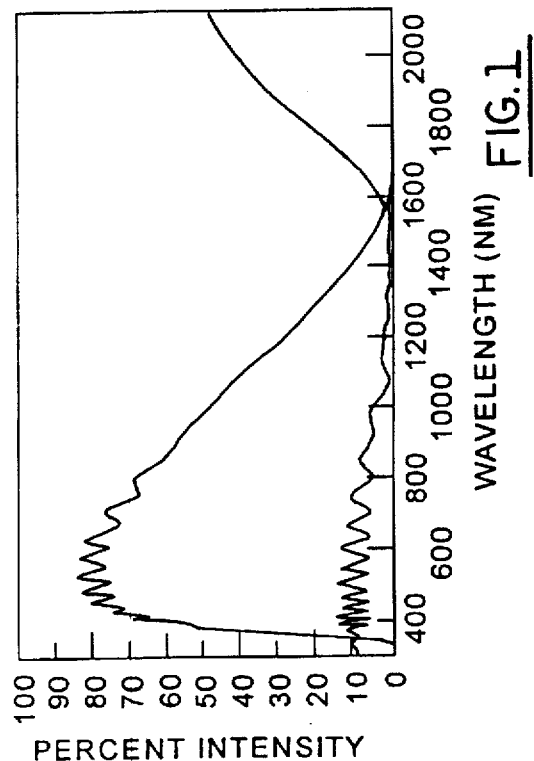
FIG. 3 is a spectrograph which shows the transmission and reflection of a three-layer ITO stack according to an embodiment of the present invention.
Figure 4:
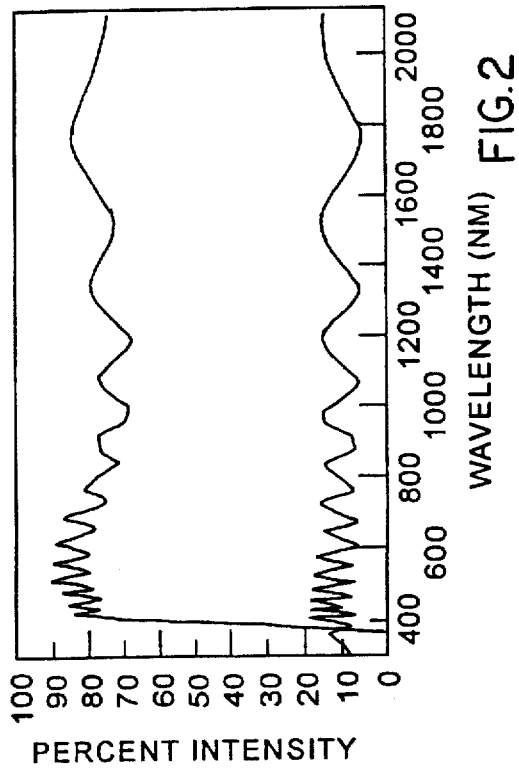
FIG. 4 is a spectrograph which shows the transmission and reflection of the stack of FIG. 3 after annealing at 600° C. in air for one hours.

Two samples of stack 1c were annealed in air at elevated temperatures of 500° and 600° C., respectively, for 1 hour each. The same was done with two samples of 1d. Optical measurements had been taken before annealing of the stacks. After annealing similar measurements were made to determine if any adverse changes had occurred. In particular, all four samples were retested for optical transmission and reflection in the near UV, visible, and near IR portion of the spectra. As can be seen from the data shown in FIGS. 3 and 4, there is no significant change in optical properties for the TCO's protected with the $Si_3N_4$ layers. Due to the non-conductive nature of the outer $Si_3N_4$, we were not able to measure the resistivity of the ZnAlO directly. However, an analysis of the I-R reflectivity was used to calculate the electrical conductivity of the layer in question. Analysis of the IR reflectivity suggests that the electrical conductivity was essentially maintained. FIGS. 3 and 4, respectively, show the optical transmission and reluctance spectrum of a Si3N4/AlZnO/Si3N4 film stack on soda-lime-silica glass according to an embodiment of the present invention before and after annealing at 600° C. in air. The spectrum was virtually unchanged thereby verifying the thermal stability of this stack.

In another embodiment of the invention, a thin layer of a TCO such as fluorine doped $SnO_2$ is used in place of $Si_3N_4$ in order to allow direct connection of electrical contacts through the outer layer and into the main ZnAlO transparent conductor. It suitably provides excellent protection for the properties of the electroconductive film during the bending process.

In order to determine the durability of the film stack, Taber abrasion data was taken on both the single layer ZnAlO and the three layer stack as shown. We find that both thin films show only minor changes in haze after 1000 cycles of the wheel. Thus, this stack passes the required abrasion durability test for automotive glass products. We believe that the three layer stack thus is durable to not only during thermal bending and tempering, but also to abrasion and chemical environmental attack as well. Thus this stack could be used on one of the outside surfaces of automotive glazings such as the windshield or side windows which ideally allows simplification of fabrication techniques. As discussed above, prior heating materials needed to be used within the laminated windshield due to durability concerns.

We claim:

1. A glass substrate having deposited thereon an electrically conductive, durable coating useful for defrosting said glass substrate, said coating consisting essentially of:
    a first layer comprising a diffusion barrier material selected from the group consisting essentially of: (a) silicon oxide and (b) silicon nitride deposited on at least a portion of a surface of said glass substrate;
    a second layer comprising an electrically conductive material selected from the group consisting essentially of (a) aluminum doped zinc oxide and (b) gallium doped zinc oxide deposited on at least a portion of said first layer in a thickness of at least 1 micron and having a sheet resistance of less than 20 ohms per square; and
    a third layer comprising a protective material deposited on and at least coextensive with said second layer and in a thickness of at least 10 microns, said protective material being selected from the group consisting essentially of: (a) fluorine doped tin oxide, and (b) silicon nitride, and wherein said third layer has a refractive index within 10% of that of said second layer.

2. The glass substrate according to claim 1 wherein said silicon oxide has the chemical formula: $SiO_{1.5-2.5}$; said aluminum zinc oxide has the chemical formula: $ZnAl_{0.001-0.1}O_{0.8-1.2}$; said silicon nitride has the chemical formula: $S_3N_{3.5-4.5}$; and said tin oxide has the chemical formula: $SnO_{1.5-2.5}$.

3. The glass substrate according to claim 2 wherein said silicon oxide has the chemical formula : $SiO_{1.8-2.2}$; said aluminum zinc oxide has the chemical formula: $ZnAl_{0.001-0.05}O_{0.9\geq1.1}$; said galium doped zinc oxide has the chemical formula: $ZnGa_{0.001-0.10}O_{8-1.2}$; said silicon nitride has the chemical formula: $S_3N_{3.8-4.2}$; and said tin oxide has the chemical formula: $SnO_{1.9-2.2}$.

4. The glass substrate according to claim 3 wherein said silicon oxide has the chemical formula : $SiO_{1.9-2.1}$; said aluminum zinc oxide has the chemical formula: $ZnAl_{0.001-0.03}O_{0.95-1.05}$; said silicon nitride has the chemical formula: $S_3N_{3.9-4.1}$; and said tin oxide has the chemical formula: $SnO_{1.9-2.1}$.

5. The glass substrate according to claim 1 wherein said electroconductive coating is aluminum doped zinc oxide, said first layer is selected from silicon oxide and silicon nitride and said third layer is flourine doped tin oxide.

6. The glass substrate according to claim 1 wherein said first layer is provided in a thickness of at least 5 nm.

7. The glass substrate according to claim 6 wherein said first layer is provided in a thickness of between about 100 and 200 nm.

8. The glass substrate according to claim 1 wherein said third layer is at least 20 nm in thickness.

9. The glass substrate according to claim 8 wherein said third layer is between about 30 and 200 nm in thickness.

10. The glass substrate according to claim 1 wherein said glass substrate is an automotive vehicle glazing.

11. The glass substrate according to claim 10 wherein said automotive glazing is selected from an automotive vehicle windshield and side glass.

12. A method for providing an electrically heatable coating on a glass substrate which comprises the steps of:
    depositing a first layer comprising a diffusion barrier material selected from the group consisting essentially of: (a) silicon oxide and (b) silicon nitride on at least a portion of a surface of said glass substrate;

depositing a second layer comprising an electrically conductive material selected from the group consisting essentially of (a) aluminum doped zinc oxide and (b) gallium doped zinc oxide on at least a portion of said first layer in a thickness of at least 1 micron and having a sheet resistance of less than 20 ohms per square; and depositing a third layer comprising a protective material in a thickness of at least 10 microns on and at least coextensive with said second layer and selected from the group consisting essentially of: (a) fluorine doped tin oxide, and (b) silicon nitride, and wherein said third layer has a refractive index within 10% of that of said second layer.

13. The method according to claim 12 wherein said silicon oxide has the chemical formula: $SiO_{1.5-2.5}$; said aluminum zinc oxide has the chemical formula: $ZnAl_{0.001-0.1}O_{0.8-1.2}$; said silicon nitride has the chemical formula: $S_3N_{3.5-4.5}$; and said tin oxide has the chemical formula: $SnO_{1.5-2.5}$.

14. The method according to claim 13 wherein said silicon oxide has the chemical formula: $SiO_{1.8-2.2}$; said aluminum zinc oxide has the chemical formula: $ZnAl_{0.001-0.05}O_{0.9-1.1}$; said silicon nitride has the chemical formula: $S_3N_{3.8-4.2}$; and said tin oxide has the chemical formula: $SnO_{1.9-2.2}$.

15. The method according to claim 14 wherein said silicon oxide has the chemical formula: $SiO_{1.9-2.1}$; said aluminum zinc oxide has the chemical formula: $ZnAl_{0.001-0.03}O_{0.95-1.05}$; said silicon nitride has the chemical formula: $S_3N_{3.9-4.1}$; and said tin oxide has the chemical formula: $SnO_{1.9-2.1}$.

16. The method according to claim 12 wherein said electroconductive coating is aluminum doped zinc oxide, said first layer is selected from silicon oxide and silicon nitride and said third layer is flourine doped tin oxide.

17. The method according to claim 12 wherein said first layer is deposited in a thickness of at least 5 nm.

18. The method according to claim 17 wherein said first layer is deposited in a thickness of between about 100 and 200 nm.

19. The method according to claim 12 wherein said third layer is at least 20 nm in thickness.

20. The method according to claim 12 wherein said glass substrate is an automotive vehicle glazing.

* * * * *